(No Model.) 2 Sheets—Sheet 1.
G. E. HENRY.
HOMINY MILL.
No. 549,315. Patented Nov. 5, 1895.
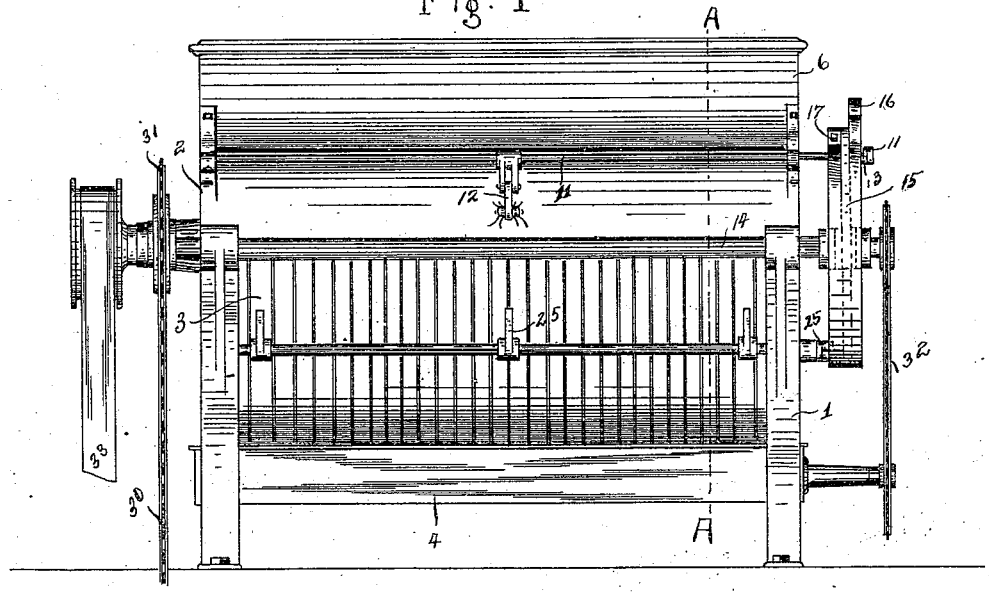
Fig. 1.
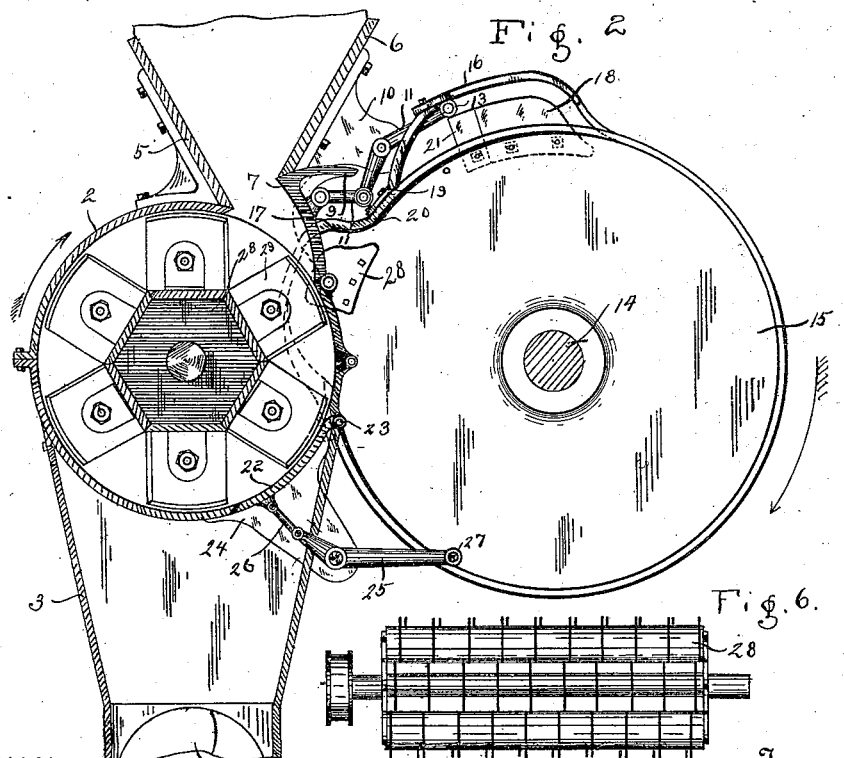
Fig. 2.
Fig. 6.
Witnesses
A. S. Courtright
G. C. Conner
Inventor
George E. Henry
By Attorney H. Lockwood

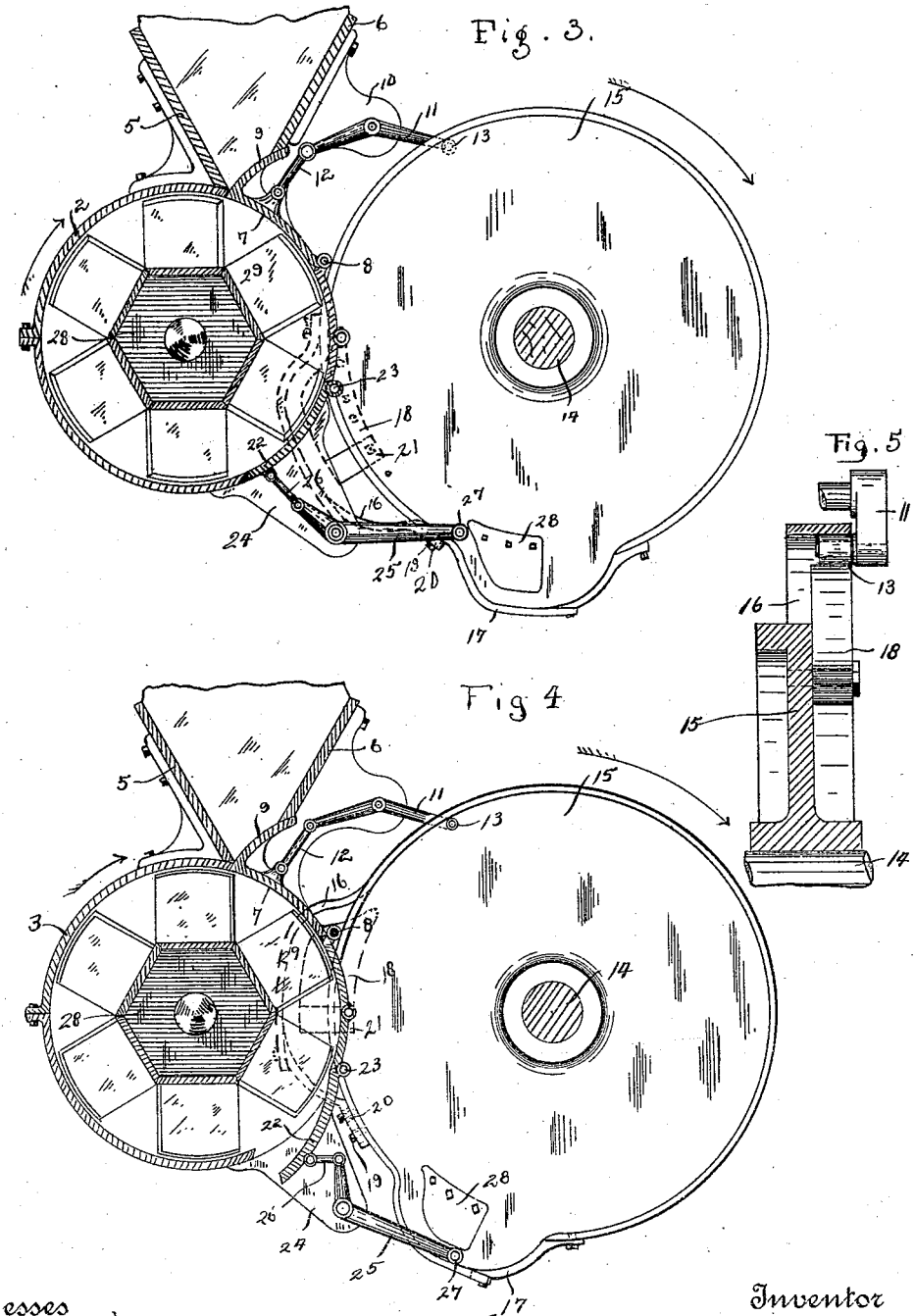

UNITED STATES PATENT OFFICE.

GEORGE E. HENRY, OF TERRE HAUTE, INDIANA, ASSIGNOR TO THE HUDNUT COMPANY, OF SAME PLACE.

HOMINY-MILL.

SPECIFICATION forming part of Letters Patent No. 549,315, dated November 5, 1895.

Application filed April 10, 1895. Serial No. 545,253. (No model.)

*To all whom it may concern:*

Be it known that I, GEORGE E. HENRY, of Terre Haute, county of Vigo, and State of Indiana, have invented a certain new and useful Hominy-Mill; and I do hereby declare that the following is a full, clear, and exact description thereof, reference being had to the accompanying drawings, in which like letters refer to like parts.

My invention relates to a hominy mill or disintegrator, and especially to a mechanism for automatically regulating the feed of the mill. The difficulty with feed mechanisms for such mills heretofore has been, so far as I am aware, their unreliability, and hence many manufacturers of hominy and other corn products have continued to employ men to regulate the feed of each mill. The feed mechanism which I have devised is, furthermore, adjustable. It can be so set as not only to regulate the feed in point of time, but also in point of quantity. This is very advantageous because of the different qualities of corn that go to the mill. A further improvement in my hominy-mill consists in making the cylinder hexagonal instead of square, as I have heretofore made it. The annular rows of knives or blades are thus only a half-inch apart, which gives to the mill twice the capacity of that containing the ordinary four-sided cylinder. This feature has been thoroughly tested and is a very valuable improvement.

The various features of my invention will appear from the accompanying drawings and the description following.

Figure 1 is a front elevation of my mill. Fig. 2 is a cross-section on the line A A of Fig. 1, with the hopper opening into the mill. Fig. 3 is the same with the hopper and discharge closed. Fig. 4 is the same with the hopper closed and the discharge open. Fig. 5 is a section of a portion of the cam-disk. Fig. 6 is a plan view of the cylinder somewhat reduced in size.

I show here the ordinary hominy-mill, excepting the cylinder. It consists of the frame 1, on which the casing 2 is mounted, having below it a chute 3, emptying into the conveyer 4, and above it the hopper. My hopper is formed in two sections, both secured to the framework; but the section 5 extends down to the casing, while the section 6 does not do so, thereby leaving between them the opening or throat of the hopper, that registers with an opening into the casing caused by the door 7, which is hinged at 8. The door has an extension 9, that serves as a slide to close the throat of the hopper when the door is shut down. Its curve fits snugly against the lower edge of the section 6 of the hopper. Extending from the section 6 of the hopper is a bracket 10, which carries the bell-crank 11, having its inner end pivoted to a link 12, that is in turn pivoted to the door 7. The free end of the bell-crank is provided with a friction-roller 13.

On a suitable counter-shaft 14 I mount a cam-disk 15, provided with a rim having lateral extensions, as seen in Fig. 5. The disk 15 is not perfectly round, but is provided with two curved extensions 16 and 17. Secured to the side of the extension 16 is the cam 18 for actuating the bell-crank 11. Its form is as shown, and when it engages the roller 13 on the bell-crank it elevates the free end of the bell-crank, thus depressing the inner end and opening the door 7, admitting corn from the hopper into the machine. The cam 18 is secured to the disk 15 by bolts 19, fitting through slots 20, whereby the position of the cam may be adjusted. The length of this cam is adjusted, also, by the addition of one or more blocks 21, or their removal, as may be desired. This is for the purpose of prolonging or shortening the period during which the door 7 is open, thus giving to the mill each time a greater or less quantity of corn, as may be desired. The extension 16 is made in two sections secured to the disk by bolts extending through slots, whereby such extension may be lengthened or shortened to accommodate itself to the length of the cam 18.

On the under side of the casing of the machine is a discharge-door 22, hinged at 23. Mounted on the bracket from the framework 24 is a bell-crank 25, with its inner end pivoted to the link 26, that is in turn pivoted to the door 22. The free end of such bell-crank is provided with a roller 27, that rides upon the rim at the lower edge of the disk 15. The edge of the disk, where it is regular, holds the bell-crank 25 in position to keep the discharge-door 22 closed; but when the extension 17 comes around the free end of the bell-crank drops and is forced down, which causes the door to open. The free end of the bell-crank is required to move downward by the cam-plate 28, secured to the extension 17 in the same manner as the cam-plate 18 is secured to the extension 16, excepting that the two are located upon opposite sides of the disk 15. In this manner there is no interference between the feed mechanism and the discharge mechanism. When the material is discharged from the mill, it passes through the chute 3 down into the conveyer 4. The operation of this feed and discharge mechanism will more clearly appear from the following brief description of it:

Assuming the hopper to be charged with material and the door 7 open, the mechanism assumes the position shown in Fig. 2. The charge of corn enters the mill and the disk revolves in the direction indicated by the arrow. The rim on the extension 16, by engaging the roller 13 of the bell-crank 11, closes the door 7, as seen in Fig. 3. The speed of the disk 15 is preferably such as to allow the corn to be acted upon about twenty seconds, at the end of which time the extension 17 will have approached the roller 27 on the free end of the lever 25, as seen in Fig. 3. It will then open the discharge-door 22 and let out the corn, as seen in Fig. 4. As soon as the extension 17 passes, the rim on the disk closes the discharge-door 22, as seen in Fig. 1, and immediately afterward the extension 16 will have come into engagement with the roller 13 on the bell-crank 11, and thus will open the door 7 for another charge of corn. This process is continued.

The period of time during which the corn is acted upon is regulated by the speed of the disk 15. The extent of the opening or throat of the hopper is regulated by the adjustment of the cam-plate 18, so that it will not draw the door 7 entirely open. The length of time during which such door 7 is open for the admission of corn is regulated by the addition or removal of the blocks 21. The cylinder or knife-shaft 28 revolves in the direction indicated by the arrow, causing the knives or blades 29 in their movement to draw the corn in from the hopper and drive it out through the discharge-opening. This arrangement materially assists in feeding and discharging material from the mill. The cylinder or knife-shaft I make hexagonal, mounting upon each of its six sides the blades or knives 29 and so placing them that their orbits will be the proper distance apart to give the best results.

The counter-shaft 14 is driven by the chain 30, passing over the sprocket-wheel 31. The conveyer is driven from the shaft 14 by the chain 32. The knife-shaft or cylinder is driven by the belt 33.

The disk 15 may be used without the extensions 17 and 18 and the rim shown; but in such case stops would probably be desired on the brackets 10 and 24 to limit the movement of the bell-cranks 11 and 25, so that they would be engaged by the cam-plates on the side of the disk.

What I claim as my invention, and desire to secure by Letters Patent, is—

1. The combination in a hominy mill of a cylinder, a hopper above the same, a door or gate opening into the cylinder from the hopper, a continuously rotating cam disk, and a link and lever connected with the door and operated by the cams on the disk to open and close such door, substantially as set forth.

2. The combination in a hominy mill, of a cylinder having a section thereof hinged to the rest of the cylinder so as to open and close, the upper end of such section being provided with a curved extension, and a hopper mounted above the cylinder with one side extending down to the cylinder and the other side to the curved top of the hinged section of the cylinder, substantially as set forth.

3. The combination in a hominy mill of a cylinder, a hopper above the same, charging and discharging doors, a link and lever mechanism connected with each door, a continuously rotating counter-shaft, and a disk thereon having suitable cams for engaging and operating the link and lever mechanism for both opening and closing the charging and discharging doors, substantially as set forth.

4. The combination in a hominy mill of a cylinder, a hopper above the same, a door opening into the cylinder, a link and lever mechanism connected therewith, a continuously rotating counter-shaft, a disk mounted on such shaft, and cam plates adjustably secured to such disk which engage the link and lever mechanism and thereby open and close the door, substantially as set forth.

5. The combination in a hominy mill of a cylinder, a hopper above the same, a door opening into the cylinder, a link and lever mechanism connected therewith, a continuously rotating counter-shaft, a disk mounted thereon with a peripheral extension and a laterally projecting rim about the disk and extension, and a cam plate secured to the extension, the length of the cam plate and the extension being peripherally adjustable, and the cam plate arranged to engage the lever mechanism and forcibly open and close the door, substantially as set forth.

6. The combination in a hominy mill, of a hopper, a cylinder, a charging and also a discharging door, a link and lever mechanism connected with each door, a disk with an extension for each door and a rim and cam plate on each side of the disk, one lever mechanism being engaged by one side and the other by the other side of the disk, substantially as set forth.

7. The combination in a hominy mill of the side 6 of the hopper, the door 7, the link 12, the bell-crank 11 pivoted to the bracket 10 and the continuously rotating disk 15 having the extension 16, a rim and the cam plate 18, all combined substantially as set forth.

8. The combination in a hominy mill, of a discharge door 22, the link 26, the bell-crank 25 pivoted to the bracket 24, and the revolving disk 15 with the extension 17, a rim and the cam plate 28, all combined substantially as set forth.

9. The combination in a hominy mill, of a hopper with the side 6, the door 7, the link 12, the bell-crank 11 pivoted to the bracket 10, the discharge door 22, the link 26, the bell crank 25 pivoted to the bracket 24, the counter-shaft 14, the disk 15 with the extensions 16 and 17, the cam plates 18 and 28, and the double rim, all combined substantially as set forth.

In witness whereof I have hereunto set my hand this 29th day of March, 1895.

GEORGE E. HENRY.

Witnesses:
V. H. LOCKWOOD,
G. C. CONNER.